United States Patent
Gupta

(10) Patent No.: US 12,112,438 B2
(45) Date of Patent: Oct. 8, 2024

(54) VIRTUAL ENVIRONMENT-TO-VIRTUAL ENVIRONMENT COMMUNICATION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 17/816,091

(22) Filed: Jul. 29, 2022

(65) Prior Publication Data

US 2024/0037861 A1 Feb. 1, 2024

(51) Int. Cl.
*G06T 19/00* (2011.01)
*G06T 13/40* (2011.01)

(52) U.S. Cl.
CPC ............ *G06T 19/006* (2013.01); *G06T 13/40* (2013.01); *G06T 19/003* (2013.01)

(58) Field of Classification Search
CPC ...... G06T 19/006; G06T 19/003; G06T 13/40
See application file for complete search history.

(56) References Cited

U.S. PATENT DOCUMENTS

| | | | |
|---|---|---|---|
| 8,051,462 B2 * | 11/2011 | Hamilton, II | H04L 63/0428 709/225 |
| 8,454,431 B2 | 6/2013 | Van Luchene | |
| 8,458,603 B2 | 6/2013 | Finn et al. | |
| 8,578,285 B2 | 11/2013 | Wetzer et al. | |
| 8,650,096 B2 | 2/2014 | Van Buskirk et al. | |
| 8,751,626 B2 | 6/2014 | Pinkston et al. | |
| 8,769,600 B2 | 7/2014 | Relyea et al. | |
| 8,849,917 B2 | 9/2014 | Dawson et al. | |
| 8,935,359 B2 | 1/2015 | Carr et al. | |
| 9,235,319 B2 | 1/2016 | Finn et al. | |
| 9,338,200 B2 | 5/2016 | Park et al. | |
| 9,466,278 B2 | 10/2016 | Rosedale et al. | |
| 9,895,612 B2 | 2/2018 | Pacey et al. | |
| 10,242,032 B2 | 3/2019 | Sundaresan et al. | |
| 10,326,667 B2 | 6/2019 | Jones et al. | |
| 10,373,158 B1 | 8/2019 | James et al. | |
| 10,438,290 B1 | 10/2019 | Winklevoss et al. | |
| 10,540,640 B1 | 1/2020 | James et al. | |
| 10,540,654 B1 | 1/2020 | James et al. | |
| 10,878,177 B2 | 12/2020 | Andriotis et al. | |
| 11,235,530 B2 | 2/2022 | Kaltenbach et al. | |
| 11,651,108 B1 * | 5/2023 | Swanson | H04N 7/157 726/27 |
| 2008/0303811 A1 | 12/2008 | Van Luchene | |

(Continued)

*Primary Examiner* — King Y Poon
*Assistant Examiner* — Vincent Peren

(57) ABSTRACT

A system for implementing a virtual environment-to-virtual environment communication transmits a request to access a particular location of a host virtual environment to be granted. In response to the request being granted, the system receives a software token to access the particular location of the host virtual environment. The software token represents a digital key to access the particular location of the host virtual environment. The system accesses the particular location using the software token. The system participates in conducting an interaction session between a first avatar from the host virtual environment and a second avatar from another virtual environment.

20 Claims, 5 Drawing Sheets

(56) References Cited

U.S. PATENT DOCUMENTS

| | | | |
|---|---|---|---|
| 2011/0126272 A1* | 5/2011 | Betzler | G06F 21/41 |
| | | | 726/6 |
| 2011/0231781 A1 | 9/2011 | Betzler et al. | |
| 2014/0282990 A1* | 9/2014 | Engelhart | H04L 67/02 |
| | | | 726/9 |
| 2017/0259167 A1 | 9/2017 | Cook et al. | |
| 2018/0104595 A1 | 4/2018 | Kawachiya et al. | |
| 2018/0159841 A1* | 6/2018 | Toff | H04L 63/08 |
| 2019/0362312 A1* | 11/2019 | Platt | H04L 65/1069 |
| 2024/0039926 A1 | 2/2024 | Gupta | |

\* cited by examiner

VIRTUAL ENVIRONMENT-TO-VIRTUAL ENVIRONMENT COMMUNICATION

TECHNICAL FIELD

The present disclosure relates generally to cryptography and security, and more specifically to a virtual environment-to-virtual environment communication.

BACKGROUND

Users of a virtual environment are able to access the virtual environment and operate within the virtual environment. If a user wants to access a particular virtual environment, the user has to open a new profile at the particular virtual environment. Otherwise, the user cannot access the particular virtual environment. It is challenging to implement a virtual environment-to-virtual environment communication.

SUMMARY

The system described in the present disclosure provides several practical applications and technical advantages that overcome the current technical problems as described herein. The following disclosure is particularly integrated into a practical application of implementing a virtual environment-to-virtual environment communication. This, in turn, provides an additional practical application of implementing network communication among multiple virtual environments. For example, by implementing a virtual environment-to-virtual environment communication, avatars (or users) associated with a first virtual environment are able to communicate and share data with avatars (or users) associated with a second virtual environment, and vice versa. In this way, a network communication channel between multiple virtual environments associated with different organizations is achieved which is non-existent in the current technology.

Virtual Environment-to-Virtual Environment Communication

The disclosed system contemplates a system and a method configured to implement a virtual environment-to-virtual environment communication. In an example operation, a first user associated with a first virtual environment wants to access a particular location in a second virtual environment to interact with a second user (or entity) associated with the second virtual environment. In this example, the second virtual environment is the host of the interaction session between the first avatar (operated by the first user) and the second avatar (operated by the second user). The first user may initiate a request to gain access to the particular location in the host virtual environment.

A host virtual environment management device associated with the host virtual environment may grant the request, generate a software token for the interaction session, and transmit the software token to a first virtual environment management device associated with the first virtual environment. The software token represents a digital key to access the particular location of the host virtual environment. The first virtual environment management device may use the software token to access the particular location of the host virtual environment. The first and the host virtual environment management devices may participate in conducting the interaction session between the first avatar and the second avatar. During the interaction session, the first and second avatars may perform the task, where the task may include communicating, interacting, and sharing data with each other. In this manner, the disclosed system is integrated into the practical application of implementing a virtual environment-to-virtual environment communication.

Furthermore, the disclosed system is integrated into an additional practical application of conserving and saving memory and computer resources associated with the host virtual environment management device. For example, assume that the first user does not have a profile (or an avatar) in the host virtual environment. If the first user wants to access the particular location in the host virtual environment, one potential approach is that the first user opens a new profile in the host virtual environment. However, this approach suffers from several drawbacks. For example, establishing a new profile and therefore a new avatar for the first user in the host virtual environment may consume and occupy memory and computer resources associated with the host environment management device. In some cases, the first user may not access the host virtual environment on a regular basis. In such cases, the memory and computer resources used for storing and processing the profile and avatar of the first user are wasted and not utilized efficiently. Thus, by implementing the virtual environment-to-virtual environment communication, the first user can access the desired location in the host virtual environment without having a profile or avatar in the host virtual environment.

The disclosed system is configured to detect anomalies with respect to the interaction session and/or the location where the interaction session is being conducted (or to be conducted). For example, an anomaly may include unauthorized access to the interaction session, unauthorized access to the location, a data breach to the interaction session, a data breach to the location, and the like by a third party (e.g., a bad actor). If the disclosed system detects such anomalies, it may terminate the interaction session so that the bad actor is not able to access the interaction session and information shared between the first and second avatars during the interaction session. This provides an additional practical application of securing information shared between the first and second avatars during the interaction session.

In one embodiment, a system for implementing a virtual environment-to-virtual environment communication comprises a memory and a processor. The memory is configured to store a task to be performed in a particular location of a host virtual environment, wherein the task is to be performed during an interaction session between one or more first avatars associated with a first virtual environment with one or more second avatars associated with the host virtual environment. The processor is associated with the first virtual environment and operably coupled with the memory. The processor transmits a request to access the particular location of the host virtual environment to be granted. The request comprises avatar information associated with the one or more first avatars. The avatar information comprises credentials associated with the one or more first avatars. The avatar information is used to verify an identity of the one or more first avatars. In response to the request being granted, the processor receives a software token to access the particular location of the host virtual environment. The software token represents a digital key to access the particular location of the host virtual environment. The software token uniquely identifies the particular location of the host virtual environment. The processor accesses the particular location of the host virtual environment using the software token. The processor participates in conducting the interaction session between the one or more first avatars and the one or more second avatars in the particular location of the host virtual environment until the software token is valid.

Hosting a Virtual Environment-to-Virtual Environment Interaction Session

The disclosed system contemplates a system and a method for hosting a virtual environment-to-virtual environment interaction session. As described above, a host virtual management device may receive a request to host an interaction session between avatars of the first virtual environment and avatars of the host virtual environment in a particular location in the host virtual environment. In response to receiving the request, the host virtual environment management device generates a software token for the interaction session, and transmits the software token to the first virtual environment management device associated with the first virtual environment.

To initiate the interaction session, the software token is presented to the host virtual management device, e.g., by the first avatar associated with the first virtual environment that is the attendee of the interaction session with the second avatar associated with the host virtual environment. The host virtual environment management device determines whether the first avatar is authorized to attend the interaction session by verifying their credentials and avatar information. The host virtual environment management device also determines whether the software token is valid by comparing the software token presented by the first avatar and an initially generated software token. If it is determined that the first avatar is authorized to attend the interaction session and that the software token is valid, the host virtual environment management device initiates and hosts the virtual environment-to-virtual environment interaction session between the first avatar and the second avatar at the particular location in the host virtual environment.

Accordingly, the disclosed system is integrated into an additional practical application of improving the security of the host virtual environment management device. For example, by validating authorized avatars to attend the interaction session, bad actors are prevented to attend or otherwise access the interaction session. Therefore, computer resources associated with the host virtual environment management device are kept secure from unauthorized access. This, in turn, provides an additional practical application of improving the underlying operations of the host virtual environment management device and any other computing device that is used to maintain the first virtual environment.

In one embodiment, a system for hosting a virtual environment-to-virtual environment interaction session comprises a network interface and a processor. The network interface is configured to receive a request to grant access to a particular location in a host virtual environment. The request comprises avatar information associated with one or more first avatars associated with a first virtual environment. The avatar information comprises credentials associated with the one or more first avatars. The processor is associated with the host virtual environment and operably coupled to the network interface. The processor generates a software token that uniquely identifies the particular location in the host virtual environment, wherein the software token represents a digital key to gain access the particular location in the host virtual environment. The processor communicates the software token to a computing device associated with the first virtual environment. The processor detects that the one or more first avatars present the software token to gain access to the particular location in the host virtual environment. The processor determines that the software token is valid. The processor hosts an interaction session between the one or more first avatars and one or more second avatars associated with the host virtual environment in the particular location of the host virtual environment until the software token is valid.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for implementing a virtual environment-to-virtual environment communication and hosting a virtual environment-to-virtual environment interaction session. Embodiments of the present disclosure and its advantages may be understood by referring to FIGS. 1 through 5. FIGS. 1 through 5 are used to describe systems and methods for implementing a virtual environment-to-virtual environment communication and hosting a virtual environment-to-virtual environment interaction session.

Figure 1:
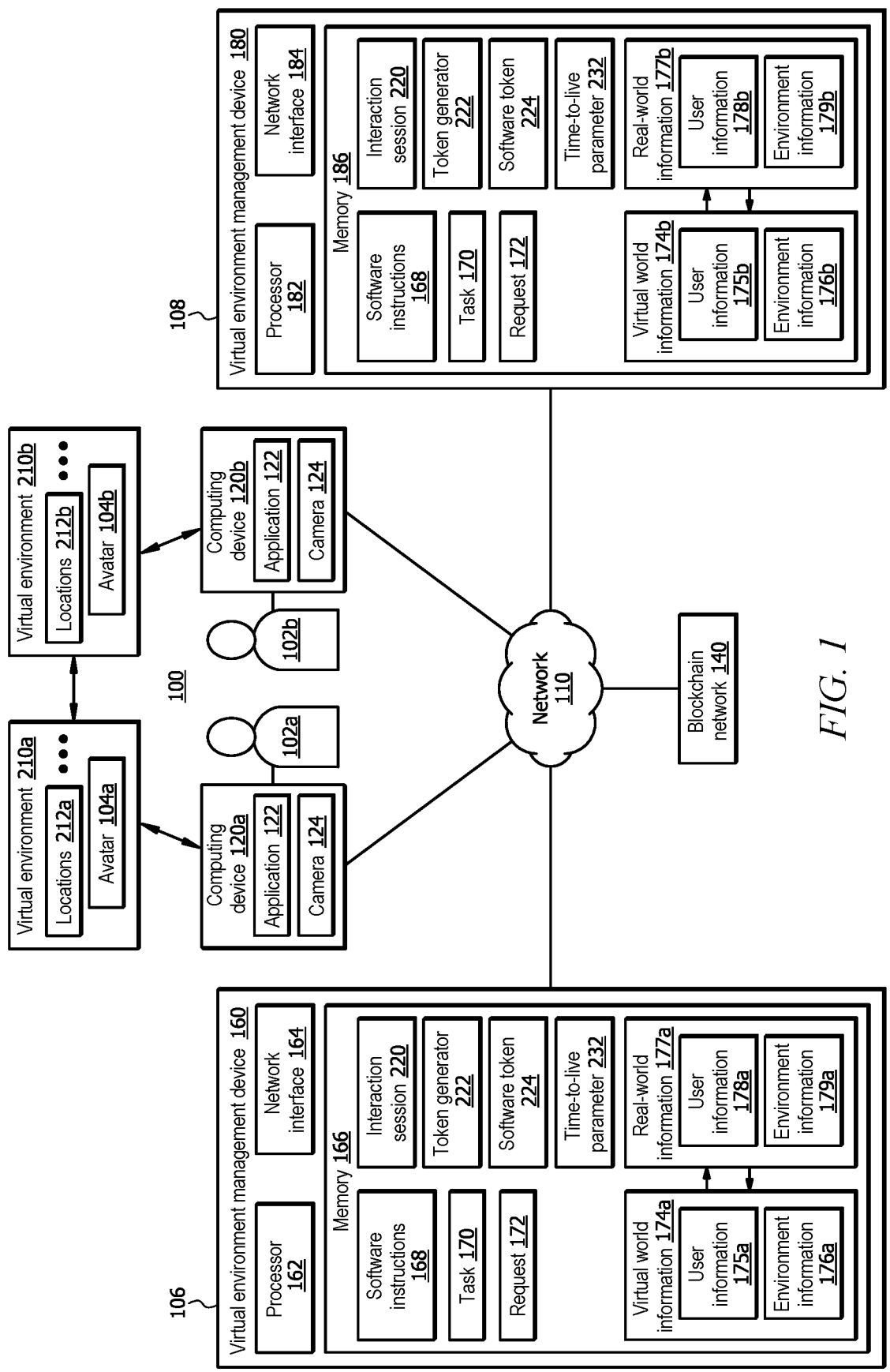
FIG. 1 illustrates an embodiment of a system configured to implement a virtual environment-to-virtual environment communication.

System for Implementing a Virtual Environment-to-Virtual Environment Communication FIG. 1 illustrates an embodiment of a system 100 that is generally configured to implement a virtual environment-to-virtual environment communication and interaction sessions among avatars from different virtual environments. In certain embodiments, the system 100 comprises one or more virtual environment management devices 160, 180 operably coupled to one or more computing devices 120 (e.g., computing devices 120a-b), and a blockchain network 140 via a network 110. Network 110 enables the communication between the components of the system 100.

The virtual environment management device 160 comprises a processor 162 in signal communication with a memory 166. Memory 166 stores software instructions 168 that when executed by the processor 162, cause the virtual environment management device 160 to perform one or more operations described herein. For example, when the software instructions 168 are executed, the virtual environment management device 160 facilitates the virtual environment 210a to run, allows users 102 to access the virtual environment 210a, operate their avatars 104 in the virtual environment 210a (if they already have a profile in the virtual environment 210a), interact with other avatars 104 and entities, perform functions (e.g., roam around, jump, wave, travel to locations 212a, perform tasks, etc.). In another example, when the software instructions 168 are executed, the virtual environment management device 160 implements a virtual environment-to-virtual environment communication between the virtual environments 210a and one or more other virtual environments 210, e.g., virtual environment 210b. In this case, the virtual environment management device 160 and the virtual environment 210a are the host of an interaction session with other virtual environments 210. During the virtual environment-to-virtual environment communication, avatars 104 in the virtual environments 210a and 210b are enabled to interact and communicate with one another, e.g., during a particular interaction session at a particular location.

The virtual environment management device 180 comprises a processor 182 in signal communication with a memory 186. Memory 186 stores software instructions 188 that when executed by the processor 182, cause the virtual environment management device 180 to perform one or more operations described herein. For example, when the software instructions 188 are executed, the virtual environment management device 180 facilitates the virtual environment 210b to run, allows users 102 to access the virtual environment 210b, operate their avatars 104 in the virtual environment 210b (if they already have a profile in the virtual environment 210b), interact with other avatars 104 and entities, perform functions (e.g., roam around, jump, wave, travel to locations 212b, perform tasks, etc.). In another example, when the software instructions 188 are executed, the virtual environment management device 180 implements a virtual environment-to-virtual environment communication between the virtual environment 210b and one or more other virtual environments 210, e.g., virtual environment 210a. In this case, the virtual environment management device 180 and the virtual environment 210b are the hosts of the interaction session with other virtual environments 210. During the virtual environment-to-virtual environment communication, avatars 104 in the virtual environments 210a and 210b are enabled to interact and communicate with one another, e.g., during a particular interaction session at a particular location.

In some cases, the virtual environment management device 180 may be the host of the interaction session 220, and the virtual environment management device 160 may request to perform a task 170 at a particular location 212b in the virtual environment 210b. In some cases, the virtual environment management device 160 may be the host of the interaction session 220, and the virtual environment management device 180 may request to perform a task 170 at a particular location 212a in the virtual environment 210a. Operations of the system 100 for implementing a virtual environment-to-virtual environment communication are described in greater detail in FIG. 3 in conjunction with the operational flow 300, FIG. 4 in conjunction with the method 400, and FIG. 5 in conjunction with the method 500. In other embodiments, system 100 may not have all of the components listed and/or may have other elements instead of, or in addition to, those listed above.

In general, the system 100 is integrated into a practical application of implementing a virtual environment-to-virtual environment communication. This, in turn, provides an additional practical application of implementing network communication among multiple virtual environments. For example, by implementing a virtual environment-to-virtual environment communication, avatars 104a (or users 102a) associated with a first virtual environment 210a are able to communicate and share data with avatars 104b (or users 102b) associated with a second virtual environment 210b, and vice versa. In this way, a network communication channel between multiple virtual environments associated with different organizations, 106, 108 is achieved which is non-existent in the current technology. In the current technology, the virtual environments associated with different organizations are not configured to communicate with one another. Each virtual environment is a stand-alone virtual environment. If a user wants to access a particular virtual environment, they need to open a new profile in the particular virtual environment. By implementing the virtual environment-to-virtual environment communication, a network bridge may be established between multiple virtual environments. Therefore, a user from a first virtual environment can access another virtual environment without actually opening an account in the other virtual environment.

Furthermore, the system 100 is integrated into an additional practical application of conserving and saving memory and computer resources associated with the host virtual environment management device 160 (assuming that the virtual environment management device 160 is the host of the interaction session 220). For example, assume that the user 102b does not have a profile (or an avatar) at the host virtual environment 210a. If the user 102b wants to access the particular location 212a in the host virtual environment 210a, one potential approach is that the user 102b opens a new profile in the host virtual environment 210a. However, this approach suffers from several drawbacks. For example, establishing a new profile and therefore a new avatar 104 for the user 102b in the host virtual environment 210a may consume and occupy memory and computer resources associated with the host virtual environment management device 160. In some cases, the user 102b may not access the host virtual environment 210a on a regular basis. In such cases, the memory and computer resources used for storing and processing the profile and avatar of the user 102b are wasted and not utilized efficiently. Thus, by implementing the virtual environment-to-virtual environment communication, the user 102b is able to access the desired location 212a in the host virtual environment 210a without having a profile or avatar at the host virtual environment 210a.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

Each of the computing devices 120a and 120b is an instance of a computing device 120. A computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110.

Each computing device 120 includes and/or operably coupled with a camera 124. The Camera 124 may be or include any camera that is configured to capture images of a field of view in front of the computing device 120. Examples of the camera 124 may include charge-coupled device (CCD) cameras and complementary metal-oxide semiconductor (CMOS) cameras. The camera 124 is configured to capture images of a user 102 within a real environment. The camera 124 is a hardware device that is configured to capture images continuously, at predetermined intervals, or on-demand. For example, the camera 124 is configured to receive a command from user 102 to capture an image. In another example, the camera 124 is configured to continuously capture images to form a video stream of images. The camera 124 may transmit the captured images and/or video stream to the virtual environment management device 160, 180. The virtual environment management device 160, 180 may use the images to identify the user 102 based on a comparison between a received image and a previously provided image of the user 102 in the user information 175 (e.g., user information 175a,b).

Each computing device 120 is configured to display a two-dimensional (2D) or three-dimensional (3D) representation of a virtual environment 210 to a user. Examples of a virtual environment 210 include, but are not limited to, a graphical or virtual representation of a metaverse, a map, a city, a building interior, a landscape, a fictional location, an alternate reality, or any other suitable type of location or environment.

Virtual Environment

Each of the virtual environments 210a and 210b is an instance of a virtual environment 210. A virtual environment 210 may be configured to use realistic or non-realistic physics for the motion of objects within the virtual environment 210. For example, some virtual environments 210 may be configured to use gravity whereas other virtual environments 210 may be configured not to use gravity. Within the virtual environment 210, each user 102 may be associated with an avatar 104. An avatar 104 is a graphical representation of the user 102 within the virtual environment 210. Examples of avatars 104 include, but are not limited to, a person, an animal, or an object. In some embodiments, the features and characteristics of the avatar 104 may be customizable and user-defined. For example, the size, shape, color, attire, accessories, or any other suitable type of appearance features may be specified by a user 102. By using an avatar 104, a user 102 is able to move within the virtual environment 210 to interact with other avatars 104, entities, and objects within the virtual environment 210.

The virtual environment 210a comprises locations 212a. The avatar 104a associated with the user 102a may travel to the locations 212a. The virtual environment 210b comprises locations 212b. The avatar 104b associated with the user 102b may travel to the locations 212b. In cases where the virtual environment 210a is the host of an interaction session 220, and the user 102b initiates a request to perform a task 170 in a particular location 212a, the interaction session 220 may be conducted in the location 212a that is requested by the user 102b.

Each computing device 120 is further configured to allow a user 102 to send requests and generally communicate with the virtual environment management device 160, 180. For example, a user 102 may use a computing device 120 to send a request 172 (e.g., request message) to access a particular location 212 of a host virtual environment 210. An example of this process is described in more detail below in FIG. 3.

The user 102 may use the computing device 120 to access the application 122. The application 122 may include interfaces that the user 102 can use to operate the avatar 104 in the virtual environment 210. The application 122 may be a web application, a software application, and/or a mobile application.

The user 102a is able to login to the application 122 from the computing device 120a, access the virtual environment 210a, view the representation of the virtual environment 210a on the display of the computing device 120a, and operate the avatar 104a (associated with the user 102a) in the virtual environment 210a. The user 102b is able to login to the application 122 from the computing device 120b, access the virtual environment 210b, view the representation of the virtual environment 210b on the display of the computing device 120b, and operate the avatar 104b (associated with the user 102b) in the virtual environment 210b.

In certain embodiments, when a virtual environment-to-virtual environment communication between the virtual environments 210a and 210b is established and an interaction session 220 between avatar 104a and 104b is established by the system 100, each of the computing devices 120a, b is configured to display at least a location 212 where the interaction session 220 is established. Thus, each of the users 102a, b is able to view the interaction session 220 in the host virtual environment 210 for their respective computing devices 120a, b and participate in performing a task 170.

Blockchain Network

Figure 2:
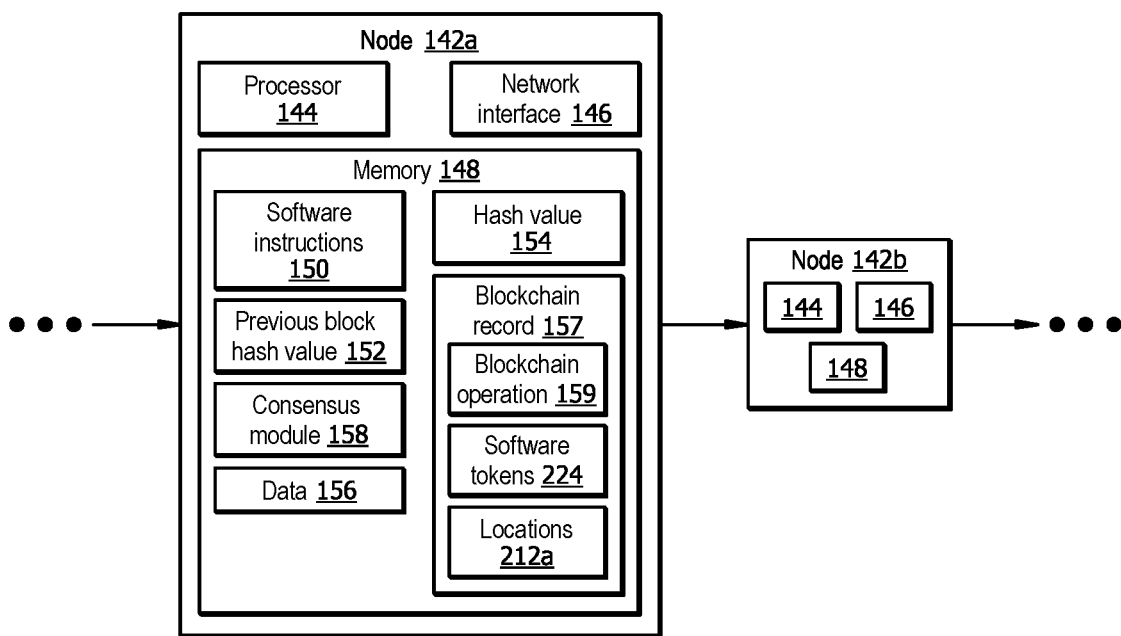
FIG. 2 illustrates an example embodiment of a blockchain network of system of FIG. 1.

FIG. 2 illustrates an example blockchain network 140 of the system 100 of FIG. 1. Blockchain network 140 comprises a cloud of computer systems (referred to herein as nodes 142, or block) and is generally configured to keep records of blockchain record 157, a blockchain, any other data, communications and interactions among the nodes 142. The blockchain record 157 may include blockchain operations 159 (e.g., blocks in a blockchain), software tokens 224, locations 212a where interaction sessions 220 are to be conducted (and already conducted), and/or any other information. A blockchain operation 159 may include a blockchain transfer or data entry. Each software token 224 is associated with its respective location 212a where the respective interaction session 220 is to be conducted (or already conducted). Thus, the blockchain record 157 may store a mapping table of software tokens 224 and their respective locations 212a.

The blockchain network 140 may comprise any number of nodes 142. Each node 142 may comprise or be associated with a computing device, a virtual environment, and/or the like. In the present disclosure, a node 142 may interchangeably be referred to as a network node or a network device. The blockchain network 140 generally refers to a distributed database (e.g., distributed record 157) shared between a plurality of nodes 142 in a network. The system 100 may employ any suitable number nodes 142 to form a distributed network that maintains the blocks in form of a blockchain. The blockchain links together the blocks of data which may include or form the blockchain record 157.

Each node 142 comprises a blockchain record 157 (e.g., stored in the memory 148) that is configured to store a copy of the blockchain record 157, which contains every blockchain operation 159 executed in the network and any other data. The blockchain record 157 comprises the blocks of data referred to as blockchain. The blockchain links together blocks of data which comprise identifiable units called blockchain operations 159. Blockchain operations 159 may comprise information, files, or any other suitable type of data, such as data associated with digital documents, user information, interaction session 220 information, task 170 information, avatar 104 information, attendees to the interaction session 220 information, host virtual environment 210 information, participant virtual environment 210 to the interaction session 220, timestamps of the interaction sessions 220, and any other type of information.

Each node 142a-b may store a copy of the blockchain record 157. Each ode 142a-b may store a copy of a blockchain. Each block in the blockchain stores a hash value 154 and information derived from a preceding block. For example, every block in the blockchain 140 includes a hash 152 of the previous block. By including the hash 152, the blockchain 140 comprises a chain of blocks from a genesis block to the current block. Each block is guaranteed to come after the previous block chronologically because the previous block's hash 152 would otherwise not be known. In one embodiment, blocks in a blockchain 140 may be linked together by identifying a preceding block with a cryptographic checksum (e.g., secure hash algorithm (SHA)-256) of its contents (e.g., blockchain records 157, and additional metadata stored in the memory 148) which serves as each block's unique identifier. Links are formed by storing the cryptographic checksum identifier of one block in the metadata of another block in the blockchain record 157, such that the former block becomes the predecessor of the latter block. In this way, the blocks form a chain that can be navigated from block-to-block by retrieving the cryptographic checksum of a particular block's predecessor from the particular block's own metadata. Each block is computationally impractical to modify once it has been in the blockchain 140 because every block after it would also have to be regenerated. These features protect data stored in the blockchain 140 from being modified by bad actors. Thus, these features improve the information security of the data stored in the blockchain 140.

The consensus module 158 is configured to establish a consensus among the nodes 142 about the present state of the distributed record 157. For example, the consensus module 158 may be executed by the processor 144 executing the software instructions 150 to implement a procedure through which all the nodes 142 of the blockchain network 140 reach a common agreement about the present state of the distributed record 157. In this way, consensus module 158 in each node 142 achieves reliability in the blockchain network 140 and establishes trust between the nodes 142 in a distributed computing environment. The consensus module 158 implements a consensus protocol to perform its operations. Essentially, the consensus protocol makes sure that every new node 142 that is added to the blockchain 140 is the one and only version of the truth that is agreed upon by all the nodes 142 in the blockchain 140. The consensus regarding the blockchain record 157 indicates that a common agreement among the blocks is reached that a given software token 224 is associated with its respective location 212a.

When a node 142 publishes an entry (e.g., a blockchain operation 159, a new block of data) in its blockchain record 157, the blockchain 140 for all other nodes 142 in the distributed network is also updated with the new entry. Thus, data published in a blockchain 140 is available and accessible to every node 142 with a blockchain record 157. This allows the data stored in the node 142 to be accessible for inspection and verification at any time by any device with a copy of the blockchain record 157.

Each of the nodes 142a-b is an instance of a node 142. Each node 142 may comprise or be associated with a processor 144 in signal communication with a memory 148 and a network interface 146. Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions 150 to perform one or more functions of a node 142 described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-5.

Each block may include information derived from a preceding block. For example, every block in the blockchain includes a hash 152 of the previous block. By including the hash 152 of the previous block, the blockchain network 140 includes a chain of blocks from a genesis node to the latest block. Each block is guaranteed to come after the previous block chronologically because the previous block's hash value 152 would otherwise not be known.

Network interface 146 is configured to enable wired and/or wireless communications (e.g., via network 110 (see FIG. 1)). The network interface 146 is configured to communicate data between the node 142 and other devices, databases, systems, or domains of the system 100 of FIG. 1. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-5 along with any other data, instructions, logic, rules, or code operable to implement the function(s) described herein when executed by processors 144. The memory 148 is operable to store software instructions 150, previous block hash value 152, hash value 154, data 156, consensus module 158, blockchain record 157, and/or any other data and instructions. The data 156 may include timestamps for executing the blockchain operations 159, index of the block, etc. The hash value 154 may be used to uniquely identify the corresponding block. For example, the hash value 154 may include an alphanumerical string. The hash 152 of the previous block may include a hash value 152 of the previous block generated before the corresponding block. The order and place of the block in the blockchain 140 may be determined by the hash 152 of the previous block. The software instructions 150 may comprise any suitable set of software instructions, logic, rules, or code that is executed by the processor 144 to perform the functions of the processor 144 and the node 142 described herein.

Referring back to FIG. 1, when a user 102b initiates a request 172 to perform a task 170 in a particular location 212a of the virtual environment 210a, the virtual environment management device 160 may generate a new block (e.g., perform a blockchain operation 159) in the blockchain network 140, generate a software token 224, associate the software token 224 with the particular location 212a and the interaction session 220, and store the software token 224 in the newly generated block in the blockchain record 157 as a blockchain operation 159. This is shared among the nodes 142. Thus, the nodes 142 would know the updated status of the blockchain record 157. Therefore, tampering with the blockchain record 157 by a bad actor is limited (or otherwise prevented) because the bad actor would have to change every instance of the blockchain record 157 stored in every node 142 which is practically impossible.

Virtual Environment Management Devices

In certain embodiments, the virtual environment management devices 160 and 180 may an instance of each other. Virtual environment management device 160 is generally a hardware device that is configured to process data and communicate with other components of the system 100 via the network 110. The virtual environment management device 160 is further configured to provide services and software and/or hardware resources to computing devices 120, the virtual environment management device 180 and other components of the system 100. The virtual environment management device 160 is further configured to perform one or more operations described further below and in conjunction with the operational flow 300 described in FIG. 3, the method 400 described in FIG. 4, and the method 500 described in FIG. 5.

Processor 162 comprises one or more processors operably coupled to the memory 166. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual environments, and the like. The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 168) to perform the operations of the virtual environment management device 160 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-5. For example, the processor 162 may be configured to perform one or more operations of method 400 as described in FIG. 4 and one or more operations of method 500 described in FIG. 5.

Network interface 164 is configured to enable wired and/or wireless communications. The network interface 164 may be configured to communicate data between the virtual environment management device 160 and other devices, systems, or domains. For example, the network interface 164 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 166 may be volatile or non-volatile and may comprise ROM, RAM, TCAM, DRAM, and SRAM. The memory 166 may include one or more of a local database, cloud database, NAS, etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-5 along with any other data, instructions, logic, rules, or code operable to implement the function(s) described herein when executed by processor 162. For example, the memory 166 may store software instructions 168, task 170, request 172, virtual world information 174a, real world information 177a, interaction session 220, token generator 222, software token 224, time-to-live parameter 232, and/or any other data or instructions. The software instructions 168 may comprise any suitable set of instructions, logic, rules, or code that is executed by the processor 162 to perform the functions described herein, such as some or all of those described in FIGS. 1-5.

The virtual environment management device 160 may be associated with an entity 106 (e.g., an organization) that provides services and/or products to its users 102a, such as the virtual environment 210a.

In certain embodiments, the virtual environment management device 160 may be associated with the virtual environment 210a. Thus, in certain embodiments, the virtual world information 174a may include user information 175a associated with users 102a that have profiles to access the virtual environment 210a and environment information 176a that is associated with the virtual environment 210a.

The virtual world information 174a comprises user information 175a and environment information 176a. The user information 175a generally comprises information that is associated with any accounts or profiles that can be used within a virtual environment 210a. For example, user information 175a may comprise user profile information, online account information, avatar information, digital resources information, or any other suitable type of information that is associated with a user 102a and their avatar 104a within a virtual environment 210a. The environment information 176a generally comprises information about the appearance of a virtual environment 210a. For example, the environment information 176a may comprise information associated with locations 212a, objects, landmarks, buildings, structures, avatars, or any other suitable type of element that is present within a virtual environment 210a. In some embodiments, the environment information 176a may be used to create a representation of a virtual environment 210a for users 102. In this case, a virtual environment 210a may be implemented using any suitable type of software framework or engine.

The real-world information 177a comprises user information 178a and environment information 179a. The user information 178a generally comprises information that is associated with any profiles of the user 102a that can be used within the real world. For example, user information 178a may comprise user profile information, account information, real-world resource information, or any other suitable type of information that is associated with a user 102a within a real-world environment. In the same or another example, the user information 178a may include an image of a user 102a, a user credential (e.g., username and password to log in and access the application 122 and thus the avatar 104 in the virtual environment 210 (e.g., virtual environment 210a)), a profile number, a serial number associated with the user 102a. In the same or another example, the user information 178a may include login frequency and login pattern associated with a user 102 that indicates the frequency and pattern of login activities of the user 102a to login to the application 122 and operate the avatar 104a in the virtual environment 210 (e.g., virtual environment 210a). In the same or another example, the user information 178a may include name, address, phone number, and any other information associated with a user 102a.

The environment information 179a generally comprises information that is associated with an entity 106 (e.g., organization) within the real world that the user 102a is a member of or is associated with. For example, the environment information 179a may comprise addresses, phone numbers, email addresses, contact names, or any other suitable type of information that is associated with an entity 106. Since the virtual environment management device 160 has access to both the virtual world information 174a and the real-world information 177a, the virtual environment management device 160 is able to link together the virtual world information 174a and the real-world information 177a for a user 102a such that changes to the virtual world information 174a affect or propagate to the real-world information 177a and vice-versa. For example, the virtual environment management device 160 may be configured to store one or more maps (e.g., actions of an avatar 104a, interactions among avatars 104a, gestures performed by an avatar 104a, etc.) that translate or convert different types of interactions between the real world and the virtual environment 210a and vice-versa.

Virtual environment management device 180 is generally a hardware device that is configured to process data and communicate with other components of the system 100 via the network 110. The virtual environment management device 180 is further configured to provide services and software and/or hardware resources to computing devices 120, virtual environment management device 160, and other components of the system 100. The virtual environment management device 180 is further configured to perform one or more operations described further below and in conjunction with the operational flow 300 described in FIG. 3, the method 400 described in FIG. 4, and the method 500 described in FIG. 5.

Processor 182 comprises one or more processors operably coupled to the memory 186. The processor 182 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual environments, and the like. The processor 182 may be a programmable logic device, a microcontroller, a microprocessor, or any suitable combination of the preceding. The one or more processors are configured to process data and may be implemented in hardware or software. For example, the processor 182 may be 8-bit, 16-bit, 32-bit, 64-bit, or of any other suitable architecture. The processor 182 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 188) to implement the operations of the virtual environment management device 160 described herein. In this way, processor 182 may be a special-purpose computer designed to implement the functions disclosed herein. In an embodiment, the processor 182 is implemented using logic units, FPGAs, ASICs, DSPs, or any other suitable hardware. The processor 182 is configured to operate as described in FIGS. 1-5. For example, the processor 182 may be configured to perform one or more operations of method 400 as described in FIG. 4 and one or more operations of method 500 as described in FIG. 5.

Network interface 184 is configured to enable wired and/or wireless communications. The network interface 184 may be configured to communicate data between the virtual environment management device 180 and other devices, systems, or domains. For example, the network interface 184 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 182 may be configured to send and receive data using the network interface 184. The network interface 184 may be configured to use any suitable type of communication protocol.

The memory 186 may be volatile or non-volatile and may comprise ROM, RAM, TCAM, DRAM, and SRAM The memory 186 may include one or more of a local database, cloud database, NAS, etc. The memory 186 comprises one or more disks, tape drives, or solid-state drives, and may be used as an over-flow data storage device, to store programs when such programs are selected for execution, and to store instructions and data that are read during program execution. The memory 186 may store any of the information described in FIGS. 1-5 along with any other data, instructions, logic, rules, or code operable to implement the function(s) described herein when executed by processor 182. For example, the memory 186 may store software instructions 188, task 170, request 172, virtual world information 174b, real world information 177b, interaction session 220, token generator 222, software token 224, time-to-live parameter 232, and/or any other data or instructions. The software instructions 188 may comprise any suitable set of instructions, logic, rules, or code that is executed by the processor 182 to perform the functions described herein, such as some or all of those described in FIGS. 1-5.

The virtual environment management device 180 may be associated with an entity 108 (e.g., an organization) that provides services and/or products to its users, such as the virtual environment 210b.

In certain embodiments, the virtual environment management device 180 may be associated with the virtual environment 210b. Thus, in certain embodiments, the virtual world information 174b may include user information 175b associated with users 102b that have accounts to access the virtual environment 210b and environment information 176b that is associated with the virtual environment 210b.

The virtual world information 174b comprises user information 175b and environment information 176b. The user information 175b generally comprises information that is associated with any profiles that can be used within a virtual environment 210b. For example, user information 175b may comprise user profile information, online account information, avatar information, digital resources information, or any other suitable type of information that is associated with a user 102b and their avatar 104b within a virtual environment 210b. The environment information 176b generally comprises information about the appearance of a virtual environment 210b. For example, the environment information 176b may comprise information associated with locations 212b, objects, landmarks, buildings, structures, avatars, or any other suitable type of element that is present within a virtual environment 210b. In some embodiments, the environment information 176b may be used to create a representation of a virtual environment 210b for users 102. In this case, a virtual environment 210b may be implemented using any suitable type of software framework or engine.

The real-world information 177b comprises user information 178b and environment information 179b. The user information 178b generally comprises information that is associated with any accounts or profiles of the user 102b that can be used within the real world. For example, user information 178b may comprise user profile information, account information, real-world resource information, or any other suitable type of information that is associated with a user 102b within a real-world environment. In the same or another example, the user information 178b may include an image of a user 102b, a user credential (e.g., username and password to log in and access the application 122 and thus the avatar 104b in the virtual environment 210b, a profile number, a serial number associated with the user 102. In the same or another example, the user information 178b may include login frequency and login pattern associated with a user 102b that indicates the frequency and pattern of login activities of the user 102b to login to the application 122 and operate the avatar 104b in the virtual environment 210b. In the same or another example, the user information 178b may include name, address, phone number, and any other information associated with a user 102b.

The environment information 179b generally comprises information that is associated with an entity 106 (e.g., organization) within the real world that the user 102 is a member of or is associated with. For example, the environment information 179b may comprise addresses, phone numbers, email addresses, contact names, or any other suitable type of information that is associated with an entity 106. Since the virtual environment management device 180 has access to both the virtual world information 174b and the real-world information 177b, the virtual environment management device 180 is able to link together the virtual world information 174b and the real-world information 177b for a user 102b such that changes to the virtual world information 174b affect or propagate to the real-world information 177b and vice-versa. For example, the virtual environment management device 180 may be configured to store one or more maps (e.g., actions of an avatar 104b, interactions among avatars 104b, gestures performed by an avatar 104b, etc.) that translate or convert different types of interactions between the real world and the virtual environment 210b and vice-versa.

Token Generator

Token generator 222 stored in the memory 166 may be implemented by the processor 162 executing the software instructions 168, and is generally configured to generate software tokens 224. For example, when the virtual environment management device 160 is the host of the interaction session 220, the virtual environment management device 160 (e.g., via an input from an operator operating the virtual environment management device 160) may instruct the processor 162 to execute the token generator 222 stored in the memory 166.

Token generator 222 stored in the memory 186 may be implemented by the processor 182 executing the software instructions 188, and is generally configured to generate software tokens 224. For example, when the virtual environment management device 180 is the host of the interaction session 220, the virtual environment management device 180 (e.g., via an input from an operator operating the virtual environment management device 180) may instruct the processor 182 to execute the token generator 222 stored in the memory 186. Token generator 222 stored in the memory 186 may be similar to the token generator 222 stored in memory 166.

In certain embodiments, each software token 224 may include a random number or a random alphanumeric string. In certain embodiments, the token generator 222 may include a random number, an alphanumeric string generator algorithm that is configured to generate a random number, or a random alphanumeric string as a token 224. The software token 224 may not be altered or otherwise changed. In certain embodiments, each software token 224 may be associated with and/or mapped with a particular location 212 in a virtual environment 210 where a respective interaction session 220 is to be conducted or already conducted.

In certain embodiments, the token generator 222 may be configured to generate a token 224 based on an interaction session 220, and a location 212 where the interaction session 220 is determined to be conducted, among others. For example, the token generator 222 may be given information about the interaction session 220 (e.g., attendees, user information 175 associated with the attendees, task 170 to be performed during the interaction session 220, etc.), location 212 where the interaction session 220 is to be conducted, a time of the interaction session 220, etc. In certain embodiments, the token generator 222 may feed this information to a hashing algorithm that is configured to implement a hashing operation on the received information. In certain embodiments, the token generator 222 may feed this information to an encryption algorithm that is configured to implement an encryption operation on the received information. The generated software token 224 may uniquely identify the location 212 of the interaction session 220 (and/or the interaction session 220).

The generated software token 224 may represent a digital key to access the location 212 of the interaction session 220. The generated token 224 may include a security artifact (e.g., a number, a serial number, an alphanumerical string, a piece of code, an encrypted code, an obfuscated code, a hashed code, and/or the like) that uniquely identifies the location 212 of the interaction session 220 (and/or the interaction session 220). Interaction session 220 may be between one or more avatars 104a that are associated with the virtual environment 210a and one or more users avatars 104b that are associated with the virtual environment 210b. The interaction session 220 may be conducted in whichever virtual environment 210 that is the host of the interaction session 220.

For clarity and consistency, it is assumed that the virtual environment 210a is the host of the interaction session 220, and one or more users 102b from the virtual environment 220b want to perform a task 170 (e.g., interaction, data communication) with one or more users 102a in a particular location 212a of the virtual environment 210a. The task 170 may include transferring or receiving virtual objects, and virtual resources (e.g., virtual products and/or virtual services) to the one or more users 102a (or their avatars 104a). After the task 170 is performed, it may be reflected in the real-world since the virtual world information 174 is linked to the real-world information 177, similar to that described above.

Figure 3:
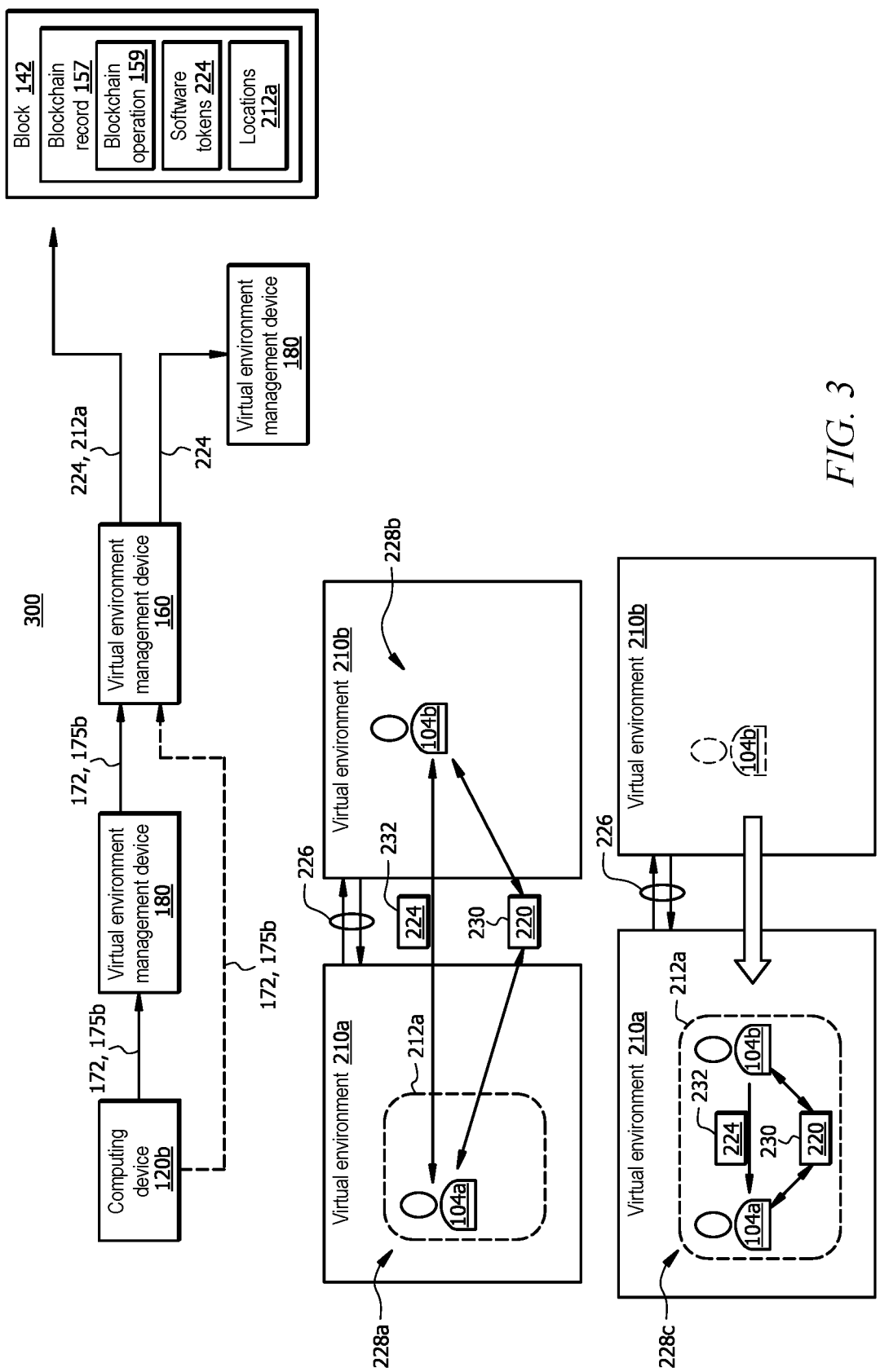
FIG. 3 illustrates an example operational flow of system of FIG. 1 for implementing a virtual environment-to-virtual environment communication.

Example Operational Flow for Implementing a Virtual Environment-to-Virtual Environment Communication FIG. 3 illustrates an example operational flow 300 of system 100 of FIG. 1 for implementing a virtual environment-to-virtual environment communication. In an example operation, assume that the virtual environment 210a is the host of the interaction session 220. The operational flow 300 begins when a user 102b operating the computing device 120b initiates a request 172 to access a particular location 212a of the host virtual environment 210a, e.g., to perform a task 170.

In certain embodiments, the computing device 120a may transmit the request 172 to the virtual environment management device 180, and the virtual environment management device 180 may forward the request 172 to the virtual environment management device 180 that is associated with the host virtual environment 210a for the request 172 to be granted. In certain embodiments, the computing device 120a may transmit the request 172 to the virtual environment management device 180.

In certain embodiments, the request 172 may include the task 170 information, location 212a to perform the task 170, avatar information (e.g., user information 175b associated with the user 102b who would be attending the interaction session 220), among other information. In certain embodiments, the request 172 may indicate that it is to be performed during an interaction session 220 between the avatar 104a (operated by the user 102a) and the avatar 104b (operated by the user 102b) at the location 212a. The location 212a may be an office, a cafe, a room, a table, or a building in the virtual environment 210a. The location 212a may be defined by a virtual boundary or geofence around the location 212a.

Determining Whether the Request is Granted

The virtual environment management device 160 may grant the request 172, e.g., in response to verifying the identity of the user 102b and that determining that the location 212a is available. The identity of the user 102b may be verified by determining that, e.g., an image of the user 102b corresponds to a previously provided image of the user 102b in the user information 175b. For example, the camera 124 associated with the computing device 120b may capture an image of the user 102b. The computing device 120b may transmit the image of the user 012b to the virtual environment management device 180.

In certain embodiments, the virtual environment management device 180 may verify the identity of the user 102b by comparing the image of the user 102b with previously provided image of the user 102b in the user information 175b, and inform the virtual environment management device 160 that the identity of the user 102b is verified.

In certain embodiments, the virtual environment management device 180 may transmit the image and the user information 175b which includes information associated with the avatar 104b and user 102b to the virtual environment management device 160. The avatar information may include credentials (e.g., identification information) associated with the avatar 104b and user 102b. The avatar information may be used to verify the identity of the user 102b and the avatar 104b, e.g., by comparing with previously provided information (e.g., image, etc.) in the user information 175b, and determining whether the newly received information (e.g., image, etc.) of the user 102b corresponds to the previously stored information (e.g., image, etc.) of the user 102 in the user information 175b, similar to that described above. The virtual environment management device 160 may use the avatar information to verify the identity of the user 102b and avatar 104b.

In response to determining that the identity of the user 102b and avatar 104b is verified, the virtual environment management device 160 may grant the request 172. The virtual environment management device 160 may deny the request 172, e.g., if the identity of the user 102b is not verified and/or the location 212a is not available.

Generating a Software Token for the Interaction Session

In response to granting the request 172, the virtual environment management device 160 may generate a software token 224 for the interaction session 220, similar to that described in FIG. 1. The virtual environment management device 160 may associate the generated software token 224 to the location 212a. The virtual environment management device 160 may generate a new block in the blockchain network 140 (see FIGS. 1 and 2), and store the software token 224 associated with the location 212a in the newly generated block. The virtual environment management device 160 may transmit the software token 224 to the virtual environment management device 180. The virtual environment management device 180 receives the software token 224 to access the particular location 212a of the host virtual environment 210a.

The virtual environment management device 160 accesses the particular location 212a using the software token 224. For example, the software token 224 may be given or provided to the user 102b (or avatar 104b) so the user 102b can use the token 224 to operate the avatar 104a to enter the virtual environment 210a and the location 212a. In certain embodiments, even the user 102b may not have a profile in the host virtual environment 210a, the user 102b is able to use the software token 224 to gain access to the location 212a.

Establishing a Virtual Environment-to-Virtual Environment Communication

In certain embodiments, in response to the request 172 being granted, the virtual environment management devices 160, 180 establish a virtual environment-to-virtual environment communication channel 226 between the host virtual environment 210a and the virtual environment 201b, via the network 110 (see FIG. 1) (i.e., between the virtual environment management devices 160 and 180. The user 102b in an active session 228b in the virtual environment 210b is able to communicate with the user 102a in an active session 228a in the virtual environment 210a. An active session 228 may be referred to when a user 102 is logged in to a respective virtual environment 210 and operates a respective avatar 104.

In such embodiments, each user 102a, 102b has their active session 228 in their respective virtual environments 210a, 210b, and they are able to communicate with each other through the virtual environment-to-virtual environment communication channel 226. For example, the users 102a, 102b (and their avatars 104a,b) are able to participate in an interaction session 220 during which the task 170 may be performed.

In certain embodiments, the organization 106 may share the location 212a with the organization 108 during the interaction session 220. For example, in response to the request 172 being granted, the virtual environment management devices 160, 180 may merge the active sessions 228a, 228b—implementing and conducting a merged active session 228c. For example, in response to receiving the user information 175b (which includes the features and characteristics of the avatar 104b), the virtual environment management device 160 may duplicate the avatar 104b information and produce a duplicated avatar 104b in the virtual environment 210a. The virtual environment management device 160 may use any avatar generating and duplicating technique to duplicate the avatar 104b in the host virtual environment 210a. For example, the virtual environment management device 160 may generate or create an avatar that has the same attributes, size, shape, and other avatar information as the avatar 104b.

The virtual environment management device 160 may provide access to control and operate the duplicated avatar 104b to the virtual environment management device 180. The virtual environment management device 180 may forward the access to control and operate the duplicated avatar 104b to the user 102b (to the computing device 120b). The virtual environment management device 160 may also provide the display and access to the virtual environment 210a to the virtual environment management device 180. The virtual environment management device 180 may forward the display and access to the virtual environment 210a to the computing device 120b and the user 102b. In this manner, the user 102b may be able to control and operate the duplicated avatar 104b in the virtual environment 210a. In such embodiments, the interaction session 220 may be conducted during the merged active session 228c.

In certain embodiments, in response to the request 172 being granted, the virtual environment management devices 160, 180 may facilitate for the avatar 104b to cross over from the virtual environment 210a to the virtual environment 210b and access the location 212a. For example, the virtual environment 210a may have a digital barrier or curtain that prevents avatars 104 from other virtual environments 210 to enter the virtual environment 210a. Thus, in certain embodiments, in response to the request 172 being granted, the avatar 104b may use the software token 224 as a digital key, a digital certificate, and/or an authorization file/data to pass the digital barrier of the virtual environment 210a and access and enter the location 212a.

In this manner, the user 102b may experience operating the avatar 104b (or its duplicate) in the host virtual environment 210a without having a profile at the host virtual environment 210a. In other words, the user 102b may be granted guest access to the horst virtual environment 210a (or at least to the particular location 212a of the host virtual environment 210a).

Determining Whether the Software Token is Valid

The virtual environment management device 160 may determine whether the software token 224 is valid (e.g., by comparing the software token 224 presented by the avatar 104b with the initially generated software token 224), and in response to determining that the software token 224 is valid, may allow the avatar 104b to pass the digital barrier of the virtual environment 210a and access the location 212a. In this manner, the avatar 104b is able to access the location 212a. In other words, the virtual environment management device 180 may access the location 212a using the software token 224.

In certain embodiments, accessing the location 212a using the software token 224 may include providing access of the location 212a to the avatar 104b (and the user 102b) and facilitating the interaction session 220, where the interaction session 220 may include data communication between the avatar 104b and avatar 104a.

The virtual environment management devices 160, 180 then conduct the interaction session 220 between the avatar 104a and the avatar 104b. For example, each of the virtual environment management devices 160, 180 may participate in conducting the interaction session 220. The virtual environment management device 160 may maintain the active session 228a while the avatar 104a is in the interaction session 220, and the virtual environment management device 180 may maintain the active session 228b while the avatar 104b is in the interaction session 220. In another example, the virtual environment management devices 160, 180 may maintain the merged session 228c.

In certain embodiments, the virtual environment management devices 160, 180 may participate in conducting the interaction session 220 until the software token 224 is valid, where participating in conducting the interaction session 220 may include allowing the avatar 104b to perform at least a portion of the task 170. For example, the virtual environment management device 160 and/or 180 may allow the avatar 104b to transfer a virtual resource, virtual object, data, information to the avatar 104a. In certain embodiments, participating in conducting the interaction session 220 may include allowing the avatar 104a to perform at least a portion of the task 170. For example, the virtual environment management devices 160 and/or 180 may allow the avatar 104*a* to receive the virtual resource, virtual object, data, and information from the avatar 104*b*.

In certain embodiments, the software token 224 may be associated with a time-to-live parameter 232. The time-to-live parameter 232 may indicate a period that the software token 224 is valid. The time-to-live parameter 232 may be five minutes, six minutes, or any other time duration. For example, the time-to-live parameter 232 may be configured by the virtual environment management device 160 based on the task 170 and amount of time needed to perform the task 170. In another example, the time-to-live parameter 232 may correspond to the time period to gain access the location 212*a* in the request 172.

In certain embodiments, the software token 224 may be evaluated every x seconds to determine whether the software token 224 is still valid, where x may be five, six, ten, hundred, etc. For example, when the interaction session 220 starts, the virtual environment management device 160 may determine whether the software token 224 is valid every x seconds. In this operation, the virtual environment management device 160 may determine whether the time-to-live parameter 232 is passed. If it is determined that the time-to-live parameter 232 is passed, the virtual environment management device 160 may determine that the software token 224 is no longer valid (i.e., invalid) and terminate the interaction session 220. If it is determined that the time-to-live parameter 232 is not passed, the virtual environment management device 160 may determine that the software token 224 is still valid and continue to participate in conducting the interaction session 220 until the software token 224 is determined to be valid. In certain embodiments, operations of determining whether the software token 224 is still valid may be performed by one or both virtual environment management devices 160, 180, similar to that described above. Participating in conducting the interaction session 220 may be in response to determining that the software token 224 is valid.

In certain embodiments, determining that the software token 224 is valid comprises comparing the software token 224 (received from or presented by the avatar 104*b*) with the software token 224 (initially generated by the token generator 222) and determining that the received software token 224 corresponds to the initial and expected software token 224.

Detecting an Anomaly with Respect to an Interaction Session

In certain embodiments, the virtual environment management device 160 and/or 180 may be configured to detect anomalies 230 with respect to an interaction session 220 and/or with respect to the location 212*a* where the interaction session 220 is being conducted (or to be conducted in). Examples of an anomaly 230 may include unauthorized access to the interaction session 220 by a third party, unauthorized access to the location 212*a*, data breach to the interaction session 220, data breach to the location 212*a*, and the like. For example, detecting an anomaly 230 may include detecting more than a threshold number (e.g., more than five, ten, etc.) of unauthorized attempts to access the interaction session 220 and/or the location 212*a* within a threshold period (e.g., within one minute, five minutes, etc.). In the same or another example, detecting an anomaly 230 may include detecting a data breach to the interaction session 220 and/o the location 212*a* by a third party.

For example, assuming that the virtual environment management device 180 detects an anomaly 230, the virtual environment management device 180 may notify the virtual environment management device 160 that the anomaly 230 is detected, e.g., by transmitting an alert message. The virtual environment management device 180 may also terminate the interaction session 220.

In another example, assuming that the virtual environment management device 160 detects an anomaly 230, the virtual environment management device 160 may notify the virtual environment management device 180 that the anomaly 230 is detected, e.g., by transmitting an alert message. The virtual environment management device 160 may also terminate the interaction session 220. This provides an additional practical application of securing information shared between the first and second avatars 104*a, b* during the interaction session 220.

Figure 4:
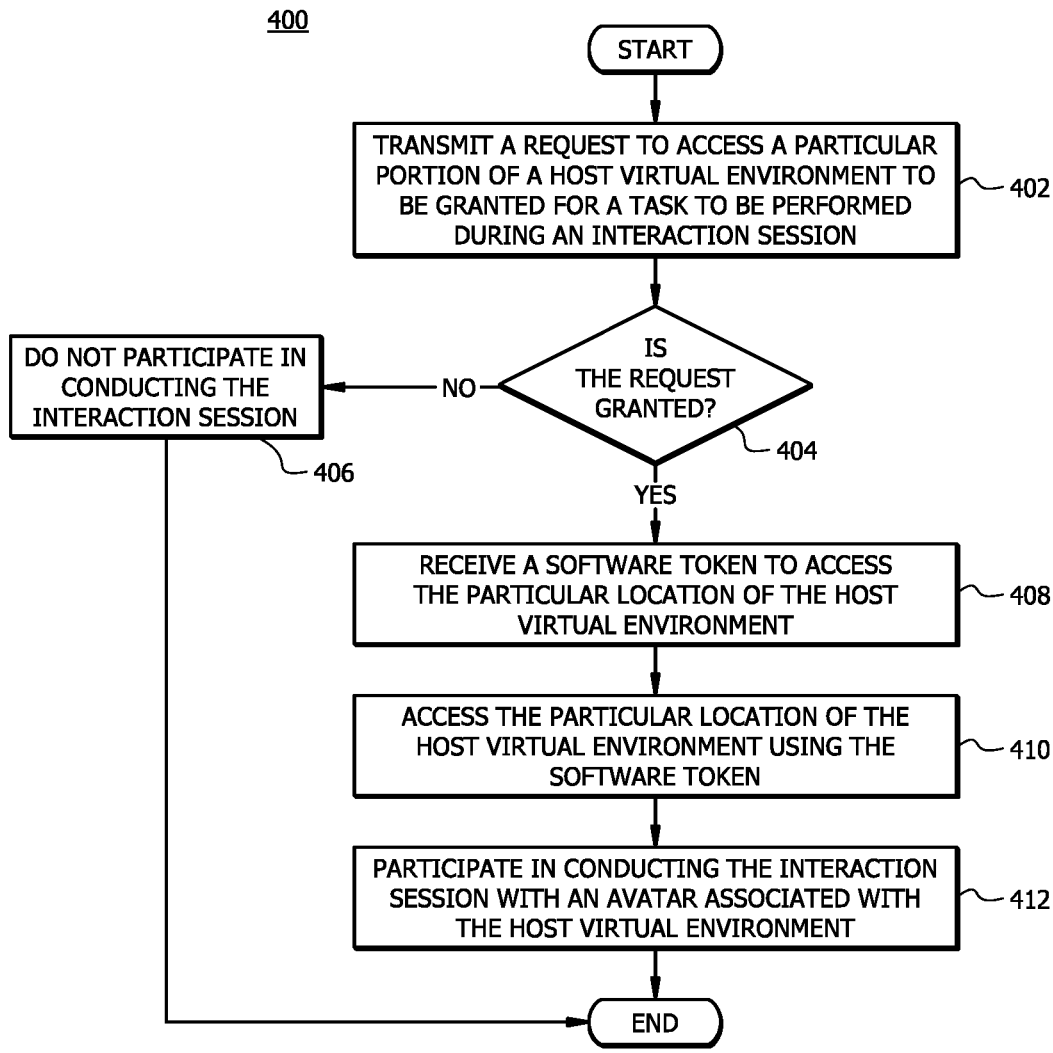
FIG. 4 illustrates an example flowchart of a method for implementing a virtual environment-to-virtual environment communication.

Example Method for Implementing a Virtual Environment-to-Virtual Environment Communication FIG. 4 illustrates an example flowchart of a method 400 for implementing a virtual environment-to-virtual environment communication. Modifications, additions, or omissions may be made to method 400. Method 400 may include more, fewer, or other operations. For example, operations may be performed in parallel or in any suitable order. While at times discussed as the system 100, virtual environment management devices 160, 180, or components of any of thereof performing operations, any suitable system or components of the system may perform one or more operations of the method 400. For example, one or more operations of method 400 may be implemented, at least in part, in the form of software instructions 168, 188 of FIG. 1, stored on non-transitory, tangible, machine-readable media (e.g., memory 166, 186 of FIG. 1) that when run by one or more processors (e.g., processor 162, 182 of FIG. 1) may cause the one or more processors to perform operations 402-412.

At operation 402, the virtual environment management device 180 transmits a request 172 to access a particular location 212*a* of a host virtual environment 210*a* to be granted for a task 170 to be performed during an interaction session 220. The interaction session 220 may be between one or more avatars 104*a* from the host virtual environment 210*a* and one or more avatars 104*b* from another virtual environment 210*b*.

At operation 404, the virtual environment management device 180 determines whether the request 172 is granted. If the virtual environment management device 180 receives a confirmation message from the virtual environment management device 160 that the request 172 is granted, the virtual environment management device 180 determines that the request 172 is granted. Otherwise, the virtual environment management device 180 determines that the request 172 is not granted. The virtual environment management device 160 may grant or deny the request 172, similar to that described in FIG. 3. If it is determined that the request 172, method 400 proceeds to operation 408. Otherwise, method 400 proceeds to operation 406.

At operation 406, the virtual environment management device 180 does not participate in conducting the interaction session 220. At operation 408, the virtual environment management device 180 receives a software token 224 to access the particular location 212*a* of the host virtual environment 210*a*. The virtual environment management device 180 may receive the software token 224 from the virtual environment management device 160, similar to that described in FIG. 3.

At operation 410, the virtual environment management device 180 accesses the particular location 212*a* of the host virtual environment 210*a* using the software token 224. For example, the virtual environment management device 180 and/or the avatar 104b presents the software token 224 to the virtual environment management device 160 and/or the avatar 104a in the host virtual environment 210a. The virtual environment management device 160 may evaluate the software token 224 by comparing it with the initially generated software token 224, similar to that described in FIG. 3. It is assumed that the software token 224 is valid, similar to that described in FIG. 3.

At operation 412, the virtual environment management device 180 participates in conducting the interaction session 220 with an avatar 104a associated with the host virtual environment 210a. While the interaction session 220 is active, the avatars 104a and 104b may perform the task 170. The task 170 and its outcome may be reflected in the real-world.

Figure 5:
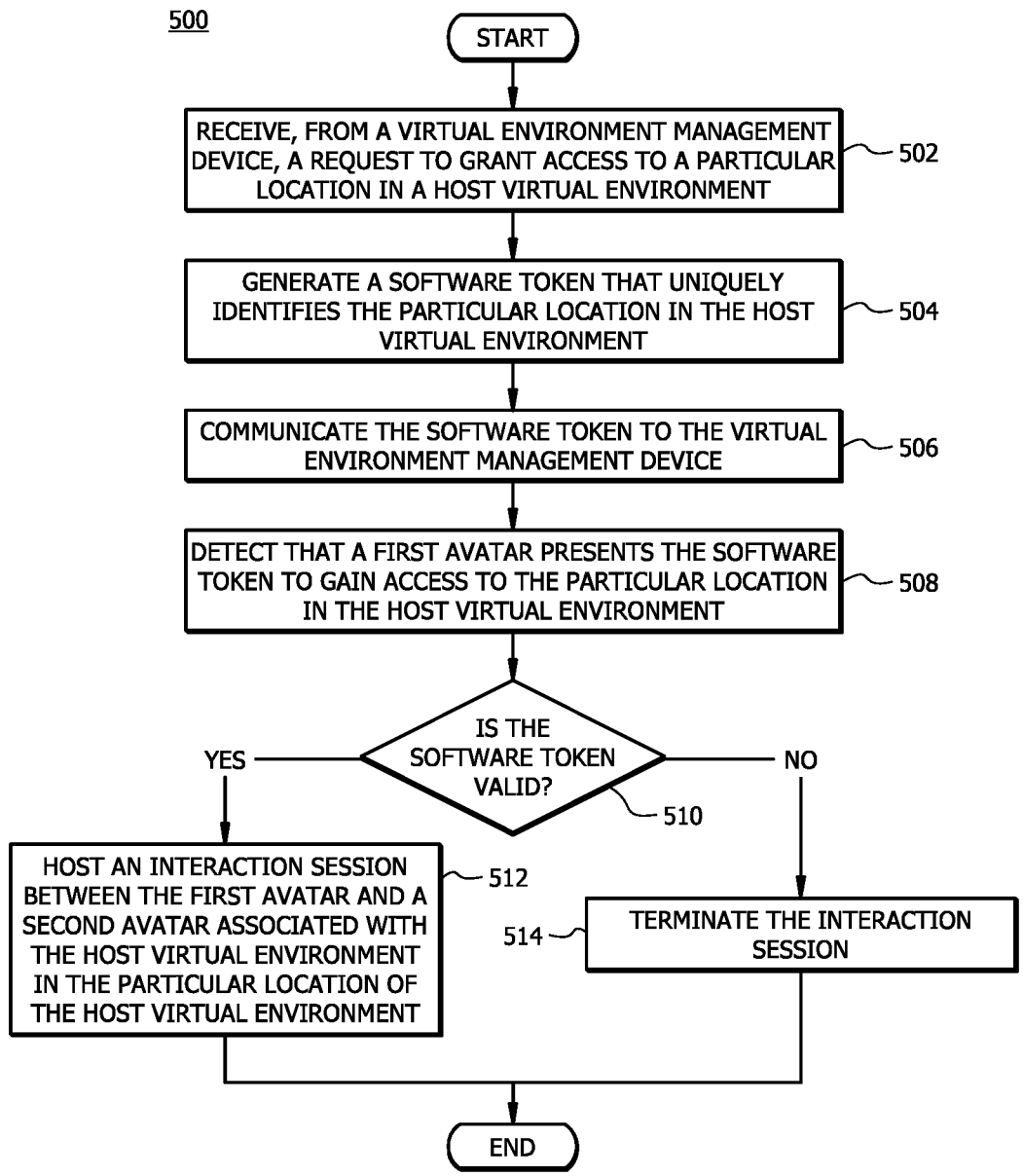
FIG. 5 illustrates an example flowchart of a method for hosting a virtual environment-to-virtual environment interaction session.

Example Method for Hosting a Virtual Environment-to-Virtual Environment Interaction Session FIG. 5 illustrates an example flowchart of a method 500 for hosting a virtual environment-to-virtual environment interaction session. Modifications, additions, or omissions may be made to method 500. Method 500 may include more, fewer, or other operations. For example, operations may be performed in parallel or in any suitable order. While at times discussed as the system 100, virtual environment management devices 160, 180, or components of any of thereof performing operations, any suitable system or components of the system may perform one or more operations of the method 500. For example, one or more operations of method 500 may be implemented, at least in part, in the form of software instructions 168, 188 of FIG. 1, stored on non-transitory, tangible, machine-readable media (e.g., memory 166, 186 of FIG. 1) that when run by one or more processors (e.g., processor 162, 182 of FIG. 1) may cause the one or more processors to perform operations 402-412.

At operation 502, the virtual environment management device 160 receives, from the virtual environment management device 180, a request 172 to grant access to a particular location 212a in the host virtual environment 210a. The request 172 may include avatar information associated with one or more avatars from the virtual environment 210b. The avatar information may include credentials of the one or more avatars from the virtual environment 210b.

At operation 504, the virtual environment management device 160 generates a software token 224 that uniquely identifies the particular location 212a in the host virtual environment 210a. The virtual environment management device 160 may generate the software token 224 using the token generator 222, similar to that described in FIG. 3.

At operation 506, the virtual environment management device 160 communicates the software token 224 to the virtual environment management device 180. In certain embodiments, the virtual environment management device 160 may generate a block in the blockchain network 140 and store the request 172 and software token 224 along with any other information in the generated block.

At operation 508, the virtual environment management device 160 detects that a first avatar 104b presents the software token 224 to gain access to the particular location 212a in the host virtual environment 210a. For example, the virtual environment management device 180 may transmit the software token 224 to the computing device 120b where the user 102b accessed the avatar 104b or otherwise make the software token 224 available to the user 102b and avatar 104b. The user 102b may operate the avatar 104b to present the software token 224 to the virtual environment management device 160 and consequently to the virtual environment 210a.

At operation 510, the virtual environment management device 160 determines whether the software token 224 is valid. The virtual environment management device 160 may determine whether the software token 224 is valid based on comparing with the initially generated software token 224 and the software token 224 received from the avatar 104b, similar to that described in FIG. 3. The virtual environment management device 160 may evaluate the software token 224 every x seconds, where x may be one, five, ten, or any other suitable number. If the virtual environment management device 160 determines that the software token 224 is valid, method 500 proceeds to operation 512. Otherwise, method 500 proceeds to operation 514.

At operation 512, the virtual environment management device 160 hosts an interaction session 220 between the first avatar 104b and the second avatar 104a associated with the host virtual environment 210a in the particular location 212a of the host virtual environment 210a. At operation 514, the virtual environment management device 160 terminates the interaction session 220.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A method for implementing a virtual environment-to-virtual environment communication, comprising:
   storing a task to be performed in a particular location of a host virtual environment, wherein the task is to be performed during an interaction session between one or more first avatars associated with a first virtual environment with one or more second avatars associated with the host virtual environment, wherein the first virtual environment is distinct from the host virtual environment;
   transmitting, from a first processor associated with the first virtual environment to a second processor associated with the host virtual environment, a request to access the particular location of the host virtual environment to be granted, wherein:
      the request comprises avatar information associated with the one or more first avatars;

the avatar information comprises credentials associated with the one or more first avatars; and the avatar information is used to verify an identity of the one or more first avatars;

in response to the request being granted:

receiving, by the first processor from the second processor, a software token to access the particular location of the host virtual environment, wherein:

the software token represents a digital key to access the particular location of the host virtual environment; and the software token uniquely identifies the particular location of the host virtual environment;

accessing, by the first processor, the particular location of the host virtual environment using the software token; and participating, by the first processor, in conducting the interaction session between the one or more first avatars and the one or more second avatars in the particular location of the host virtual environment until the software token is no longer valid.

2. The method of claim 1, wherein accessing, by the first processor, the particular location of the host virtual environment using the software token comprises:

providing access of the particular location of the host virtual environment to the one or more first avatars; and facilitating the interaction session between the one or more first avatars and the one or more second avatars, wherein the interaction session comprises data communication between the one or more first avatars and the one or more second avatars.

3. The method of claim 1, wherein participating, by the first processor, in conducting the interaction session comprises allowing the one or more first avatars to perform at least a portion of the task.

4. The method of claim 1, wherein:

the software token is associated with a time-to-live parameter;

the time-to-live parameter indicates a period that the software token is valid;

participating, by the first processor, in conducting the interaction session comprises:

determining whether the time-to-live parameter is passed;

in response to determining that the time-to-live parameter is passed:

determining that the software token is invalid; and terminating the interaction session; and in response to determining that the time-to-live parameter is not passed:

determining that the software token is valid; and participating in conducting the interaction session.

5. The method of claim 1, further comprising:

detecting, by the first processor, an anomaly with respect to the interaction session or the particular location of the host virtual environment;

in response to detecting the anomaly:

notifying, by the first processor, a computing device associated with the host virtual environment that the anomaly is detected; and terminating, by the first processor, the interaction session.

6. The method of claim 5, wherein detecting, by the first processor, the anomaly comprises at least one of:

detecting more than a threshold number of unauthorized attempts to access the interaction session or the particular location of the host virtual environment; or detecting a data breach to the interaction session or the particular location of the host virtual environment.

7. The method of claim 1, wherein:

participating, by the first processor, in conducting the interaction session is in response to determining that the software token is valid;

determining, by the first processor, that the software token is valid comprises:

comparing the software token with an initial software token; and determining that the software token corresponds to the initial software token.

8. A system for implementing a virtual environment-to-virtual environment communication, comprising:

a memory configured to store a task to be performed in a particular location of a host virtual environment, wherein the task is to be performed during an interaction session between one or more first avatars associated with a first virtual environment with one or more second avatars associated with the host virtual environment, wherein the first virtual environment is distinct from the host virtual environment;

a processor, associated with the first virtual environment, operably coupled with the memory, and configured to:

transmit, to a second processor associated with the host virtual environment, a request to access the particular location of the host virtual environment to be granted, wherein:

the request comprises avatar information associated with the one or more first avatars;

the avatar information comprises credentials associated with the one or more first avatars; and the avatar information is used to verify an identity of the one or more first avatars;

in response to the request being granted:

receive, from the second processor associated with the host virtual environment, a software token to access the particular location of the host virtual environment, wherein:

the software token represents a digital key to access the particular location of the host virtual environment; and the software token uniquely identifies the particular location of the host virtual environment;

access the particular location of the host virtual environment using the software token; and participate in conducting the interaction session between the one or more first avatars and the one or more second avatars in the particular location of the host virtual environment until the software token is no longer valid.

9. The system of claim 8, wherein accessing the particular location of the host virtual environment using the software token comprises:

providing access of the particular location of the host virtual environment to the one or more first avatars; and facilitating the interaction session between the one or more first avatars and the one or more second avatars, wherein the interaction session comprises data communication between the one or more first avatars and the one or more second avatars.

10. The system of claim 8, wherein participating in conducting the interaction session comprises allowing the one or more first avatars to perform at least a portion of the task.

11. The system of claim 8, wherein:
the software token is associated with a time-to-live parameter;
the time-to-live parameter indicates a period that the software token is valid;
participating in conducting the interaction session comprises:
determining whether the time-to-live parameter is passed;
in response to determining that the time-to-live parameter is passed:
determining that the software token is invalid; and
terminating the interaction session; and
in response to determining that the time-to-live parameter is not passed:
determining that the software token is valid; and
participating in conducting the interaction session.

12. The system of claim 8, wherein the processor is further configured to:
detect an anomaly with respect to the interaction session or the particular location of the host virtual environment;
in response to detecting the anomaly:
notify a computing device associated with the host virtual environment that the anomaly is detected; and
terminate the interaction session.

13. The system of claim 12, wherein detecting the anomaly comprises at least one of:
detecting more than a threshold number of unauthorized attempts to access the interaction session or the particular location of the host virtual environment; or
detecting a data breach to the interaction session or the particular location of the host virtual environment.

14. The system of claim 8, wherein:
participating in conducting the interaction session is in response to determining that the software token is valid;
determining that the software token is valid comprises:
comparing the software token with an initial software token; and
determining that the software token corresponds to the initial software token.

15. A non-transitory computer-readable medium that stores instructions, wherein when the instructions are executed by one or more processors, cause the one or more processors to:
transmit, from a first processor associated with a first virtual environment to a second processor associated with a host virtual environment, a request to access a particular location of the host virtual environment to be granted, wherein:
the first virtual environment is distinct from the host virtual environment;
a task is to be performed in the particular location of the host virtual environment during an interaction session between one or more first avatars associated with the first virtual environment with one or more second avatars associated with the host virtual environment;
the request comprises avatar information associated with the one or more first avatars;
the avatar information comprises credentials associated with the one or more first avatars; and
the avatar information is used to verify an identity of the one or more first avatars;
in response to the request being granted:
receive, by the first processor from the second processor, a software token to access the particular location of the host virtual environment, wherein:
the software token represents a digital key to access the particular location of the host virtual environment; and
the software token uniquely identifies the particular location of the host virtual environment;
access, by the first processor, the particular location of the host virtual environment using the software token; and
participate, by the first processor, in conducting the interaction session between the one or more first avatars and the one or more second avatars in the particular location of the host virtual environment until the software token is no longer valid.

16. The non-transitory computer-readable medium of claim 15, wherein accessing, by the first processor, the particular location of the host virtual environment using the software token comprises:
providing access of the particular location of the host virtual environment to the one or more first avatars; and
facilitating the interaction session between the one or more first avatars and the one or more second avatars, wherein the interaction session comprises data communication between the one or more first avatars and the one or more second avatars.

17. The non-transitory computer-readable medium of claim 15, wherein participating, by the first processor, in conducting the interaction session comprises allowing the one or more first avatars to perform at least a portion of the task.

18. The non-transitory computer-readable medium of claim 15, wherein:
the software token is associated with a time-to-live parameter;
the time-to-live parameter indicates a period that the software token is valid;
participating, by the first processor, in conducting the interaction session comprises:
determining whether the time-to-live parameter is passed;
in response to determining that the time-to-live parameter is passed:
determining that the software token is invalid; and
terminating the interaction session; and
in response to determining that the time-to-live parameter is not passed:
determining that the software token is valid; and
participating in conducting the interaction session.

19. The non-transitory computer-readable medium of claim 15, wherein the instructions when executed by the one or more processors, further cause the one or more processors to:
detect, by the first processor, an anomaly with respect to the interaction session or the particular location of the host virtual environment;
in response to detecting the anomaly:
notify a computing device associated with the host virtual environment that the anomaly is detected; and
terminate the interaction session.

20. The non-transitory computer-readable medium of claim 19, wherein detecting, by the first processor, the anomaly comprises at least one of:
  detect more than a threshold number of unauthorized attempts to access the interaction session or the particular location of the host virtual environment; or
  detect a data breach to the interaction session or the particular location of the host virtual environment.

* * * * *